US012503360B2

(12) United States Patent
Lee et al.

(10) Patent No.: US 12,503,360 B2
(45) Date of Patent: Dec. 23, 2025

(54) DIRECTIONAL MEMS MICROPHONE

(71) Applicant: Merry Electronics(Shenzhen) Co., Ltd., ShenZhen (CN)

(72) Inventors: Yueh-Kang Lee, Taichung (TW); Hua-Ju Shih, Taichung (TW); Jia Yin Wu, Taichung (TW)

(73) Assignee: Merry Electronics(Shenzhen) Co., Ltd., ShenZhen (CN)

( * ) Notice: Subject to any disclaimer, the term of this patent is extended or adjusted under 35 U.S.C. 154(b) by 418 days.

(21) Appl. No.: 18/307,017

(22) Filed: Apr. 26, 2023

(65) Prior Publication Data
US 2024/0327204 A1    Oct. 3, 2024

(30) Foreign Application Priority Data

Mar. 31, 2023 (TW) ................. 112112472

(51) Int. Cl.
  *B81B 7/02* (2006.01)
  *H04R 19/04* (2006.01)
(52) U.S. Cl.
  CPC ............. *B81B 7/02* (2013.01); *H04R 19/04* (2013.01); *B81B 2201/0257* (2013.01); *B81B 2203/0353* (2013.01); *H04R 2201/003* (2013.01)
(58) Field of Classification Search
  CPC ............. B81B 7/02; B81B 2201/0257; B81B 2203/0353; H04R 19/04; H04R 2201/003; H04R 19/005; H04R 1/2823
  See application file for complete search history.

(56) References Cited

U.S. PATENT DOCUMENTS

| 8,989,422 B2 * | 3/2015 | Tanaka | H04R 19/04 |
| | | | 381/175 |
| 2010/0202649 A1 * | 8/2010 | Inoda | H04R 1/021 |
| | | | 381/361 |

FOREIGN PATENT DOCUMENTS

| CN | 110650419 A | * | 1/2020 | ........... H04R 19/005 |
| CN | 110691317 A | * | 1/2020 | ............ H04R 19/04 |
| JP | 2005295278 A | * | 10/2005 | ............... H04R 1/38 |
| KR | 101931168 B1 | * | 12/2018 | ........... H04R 1/2823 |

* cited by examiner

*Primary Examiner* — Angelica M Mckinney
(74) *Attorney, Agent, or Firm* — JCIPRNET (57) ABSTRACT

A directional microelectromechanical systems (MEMS) microphone, including a first layer, a second layer, and a third layer stacked in sequence and multiple adhesive members formed between the first layer, the second layer, and the third layer, is provided. The adhesive members include an outer adhesive member disposed surrounding a periphery of the first layer, the second layer, and the third layer and an inner adhesive member disposed within a range surrounded by the outer adhesive member. The outer adhesive member and the inner adhesive member form at least two slits between the first layer, the second layer, and the third layer. An external sound is transmitted to a sound sensing element after passing through two receiving holes of the directional MEMS microphone respectively along two paths. One of the two paths passes through the at least two slits.

15 Claims, 9 Drawing Sheets

DIRECTIONAL MEMS MICROPHONE

CROSS-REFERENCE TO RELATED APPLICATION

This application claims the priority benefit of Taiwan application serial no. 112112472, filed on Mar. 31, 2023. The entirety of the above-mentioned patent application is hereby incorporated by reference herein and made a part of this specification.

BACKGROUND

Technical Field

The disclosure relates to a directional microphone, and in particular to a directional microelectromechanical systems (MEMS) microphone.

Description of Related Art

Under the thinning trend of electronic products, the thickness of the MEMS microphone package must also be thinned accordingly. Therefore, how to maintain good sound quality when the MEMS microphone package is thinned has become an important key technology in the development of MEMS microphone elements.

In particular, as the size of the condenser microphone changes to become thinner and smaller, the directivity and the signal-to-noise ratio deteriorate accordingly, which cannot meet the complex and changing requirements of the usage environment of the current electronic products. Therefore, how to combine MEMS technology to manufacture a compact condenser microphone with high directivity and signal-to-noise ratio is an issue that persons skilled in the art need to face and solve.

SUMMARY

The disclosure provides a directional MEMS microphone, which forms a sound path difference in an internal space of a monomer to achieve good directivity.

A directional MEMS microphone of the disclosure includes a first layer, a second layer, and a third layer stacked in sequence and multiple adhesive members formed between the first layer, the second layer, and the third layer. The adhesive members include an outer adhesive member disposed surrounding a periphery of the first layer, the second layer, and the third layer and an inner adhesive member disposed within a range surrounded by the outer adhesive member, and the outer adhesive member and the inner adhesive member form at least two slits between the first layer, the second layer, and the third layer. An external sound is transmitted to a sound sensing element after passing through two receiving holes of the directional MEMS microphone respectively along two paths. One of the two paths passes through the slits.

Based on the above, the directional MEMS microphone forms the monomer structure of the microphone by the first layer, the second layer, and the third layer stacked in sequence and the adhesive members formed between the first layer, the second layer, and the third layer. More importantly, in the monomer structure formed above, the adhesive members are further divided into the outer adhesive member and the inner adhesive member. The outer adhesive member is disposed surrounding the periphery of the first layer, the second layer, and the third layer, and the inner adhesive member is disposed within the range surrounded by the outer adhesive member.

At the same time, the adhesive members further form the at least two slits. The same external sound respectively passes through the two receiving holes along the two paths and enters the monomer structure and is transmitted to the sound sensing element according to the above component configuration, and one of the two paths passes through the slits. In this way, the sound passing through the slits along one of the paths is limited by the internal structure of the monomer to have a longer sound transmission path, and an obvious path difference is generated for the same sound due to the transmission path, causing difference in reception between the front end (0 degrees) and the rear end (180 degrees), so as to improve the unidirectionality of the microphone to the sound.

DETAILED DESCRIPTION OF DISCLOSED EMBODIMENTS

Figure 1:
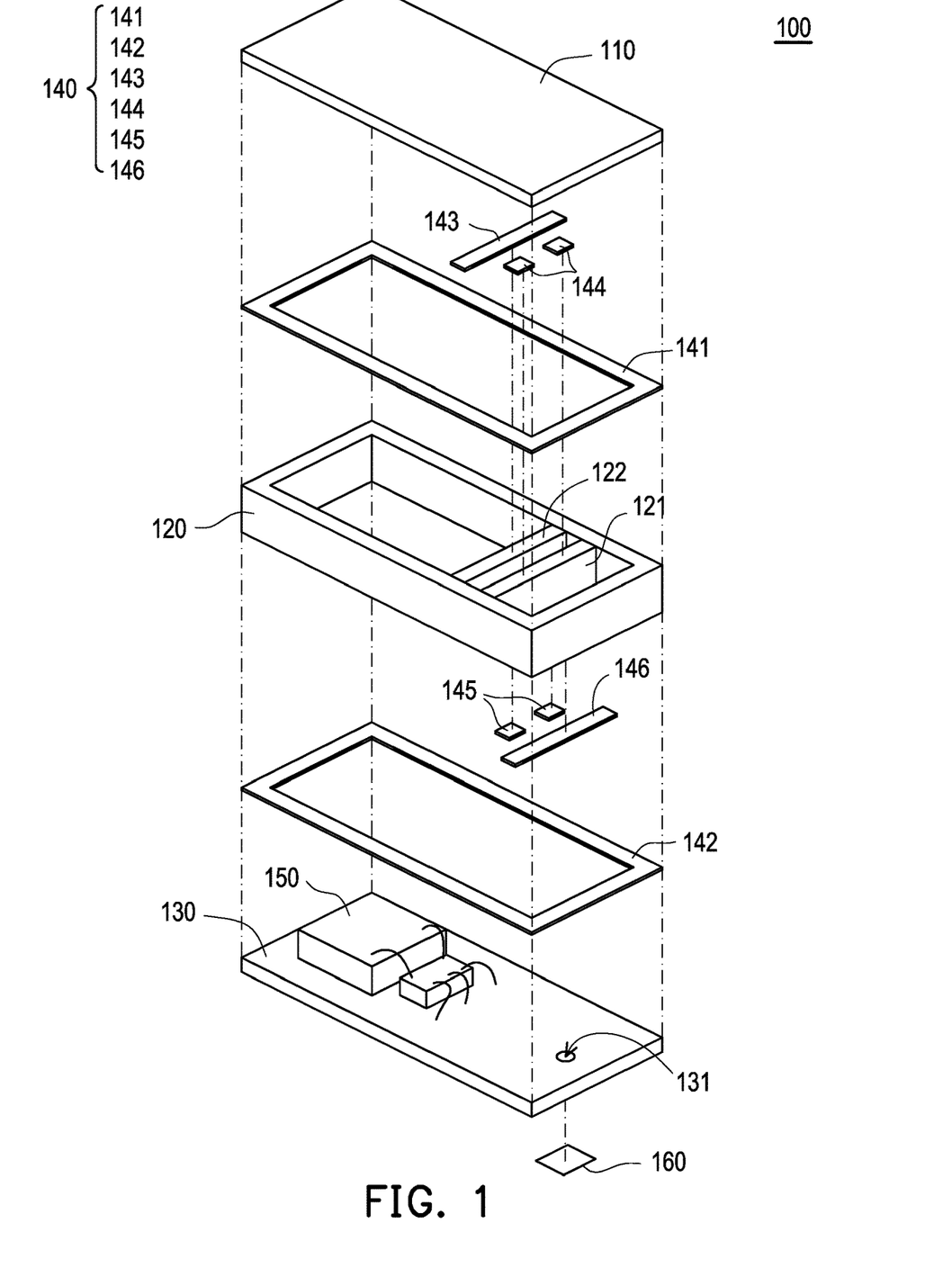
FIG. 1 is an exploded view of a directional MEMS microphone according to an embodiment of the disclosure.
Figure 2:
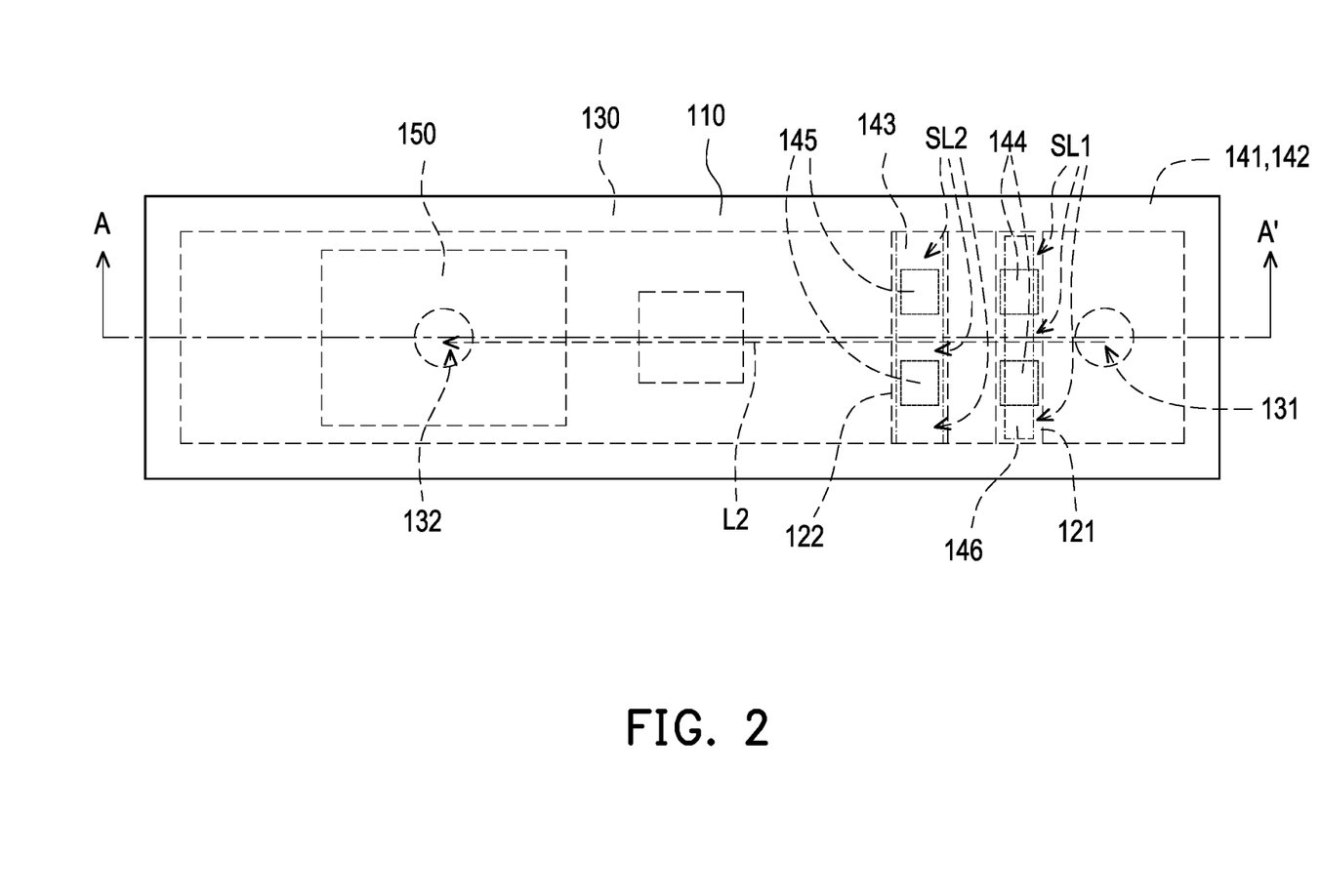
FIG. 2 is a top view of the directional MEMS microphone of FIG. 1.
Figure 3:
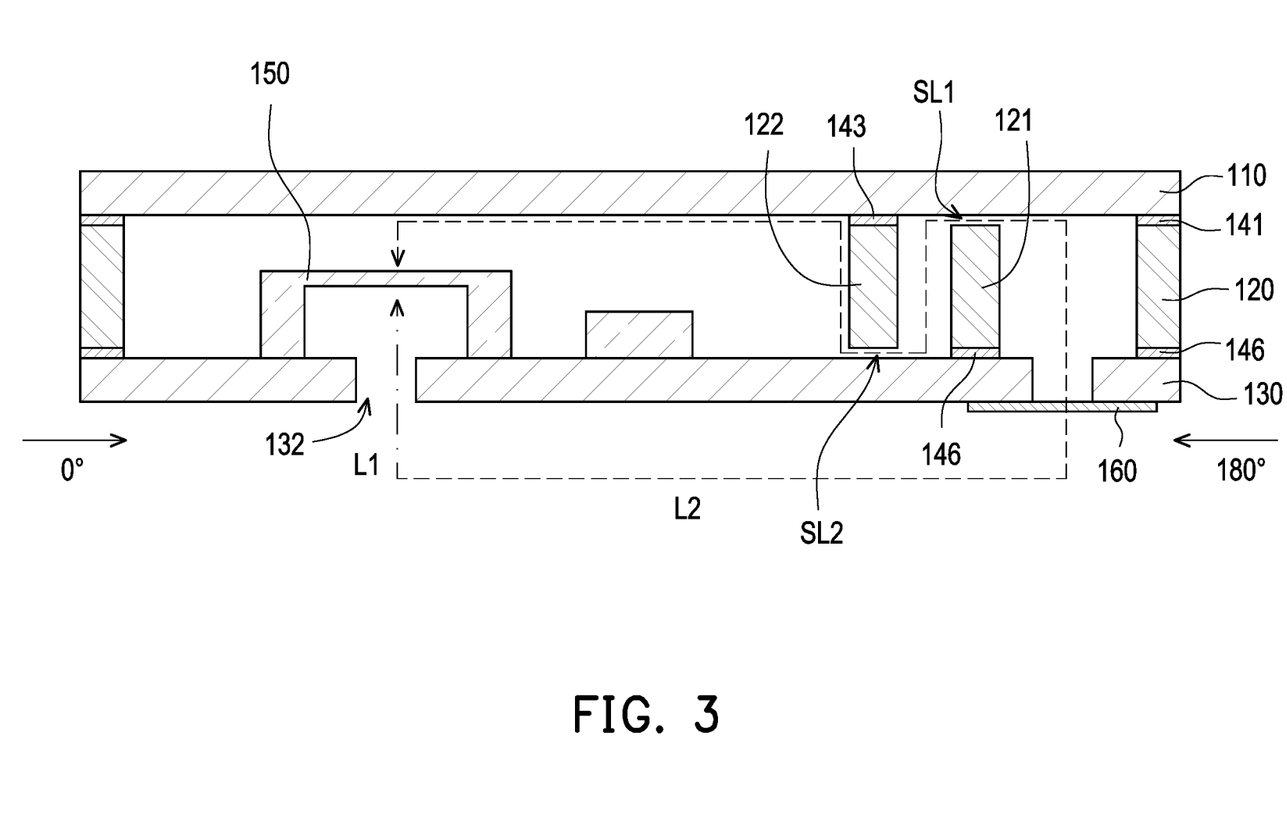
FIG. 3 is a cross-sectional view of the directional MEMS microphone of FIG. 2 along a section line A-A'.

FIG. 1 is an exploded view of a directional MEMS microphone according to an embodiment of the disclosure. FIG. 2 is a top view of the directional MEMS microphone of FIG. 1. FIG. 3 is a cross-sectional view of the directional MEMS microphone of FIG. 2 along a section line A-A'. Please refer to FIG. 1 to FIG. 3 at the same time. In the embodiment, a directional MEMS microphone 100 includes a first layer 110, a second layer 120, and a third layer 130 stacked in sequence and multiple adhesive members 140 formed between the first layer 110, the second layer 120, and the third layer 130. The adhesive members 140 include outer adhesive members 141 and 142 disposed surrounding a periphery of the first layer 110, the second layer 120, and the third layer 130 and inner adhesive members 143 to 146 disposed within a range surrounded by the outer adhesive members 141 and 142, and the outer adhesive members 141 and 142 and the inner adhesive members 143 to 146 form at least two slits SL1 and SL2 between the first layer 110, the second layer 120, and the third layer 130. An external sound is transmitted to a sound sensing element 150 after passing through two receiving holes 131 and 132 of the directional MEMS microphone 100 respectively along two paths (a first path L1 and a second path L2). One of the first path L1 and the second path L2 passes through the slits SL1 and SL2. In the embodiment, the widths of the slits SL1 and SL2 are greater than or equal to 20 μm, so as to prevent resonance of sounds below 10 KHz.

Further, in the embodiment, the first layer 110, the second layer 120, and the third layer 130 are respectively printed circuit boards, and the adhesive members 140 are solder paste, silicone, or epoxy. In other words, as shown in FIG. 1 to FIG. 3, a monomer structure of the directional MEMS microphone 100 is formed during the manufacturing process, wherein the third layer 130 is provided with the sound sensing element 150 and related electronic elements and has the two receiving holes 131 and 132. Here, the first layer 110 and the third layer 130 are respectively boards, and the second layer 120 is a constant-height layer with a thickness greater than those of the first layer 110 and the third layer 130, there are multiple partitions 121 and 122 therein to separate the inside of the monomer structure into multiple chambers, and the chambers are in air communication with each other by the slits SL1 and SL2. In another unillustrated embodiment, the first layer and the third layer are respectively printed circuit boards, and the second layer is a metal plate. In addition, in another unillustrated embodiment, the first layer and the third layer respectively have the receiving holes 131 and 132. In short, the receiving hole 131 or the receiving hole 132 may be disposed on the first layer according to requirements.

The inner adhesive member 143 is adhered between the partition 122 and the first layer 110, and the inner adhesive member 145 is adhered between the partition 122 and the third layer 130, wherein the inner adhesive member 143 covers an entire top surface of the partition 122, and the inner adhesive member 145 is only adhered to a partial bottom surface of the partition 122, so the slit SL2 is formed between the partition 122 and the third layer 130, and is substantially formed on the side of the inner adhesive member 145.

Furthermore, the inner adhesive member 144 is adhered between the partition 121 and the first layer 110, and the inner adhesive member 146 is adhered between the partition 121 and the third layer 130, wherein the inner adhesive member 146 covers an entire bottom surface of the partition 121, and the inner adhesive member 144 is only connected to a partial top surface of the partition 121, so the slit SL1 is formed between the partition 121 and the first layer 110, and is substantially formed on the side of the inner adhesive member 144.

Relatively speaking, in another unillustrated embodiment, the inner adhesive member is adhered between the partition and the first layer 110 to form the slit between the partition and the third layer 130 or the inner adhesive member is adhered between the partition and the third layer 130 to form the slit between the partition and the first layer 110, which is also applicable to the disclosure.

On the other hand, the directional MEMS microphone 100 of the embodiment also includes a sound damping member 160 disposed in one of the two receiving holes (taking the receiving hole 131 as an example here), so that the second path L2 passing through the slits SL1 and SL2 also passes through the sound damping member 160, so as to delay the transmission of sound along the second path L2, which is equivalent to increasing the transmission length.

Figure 4A:
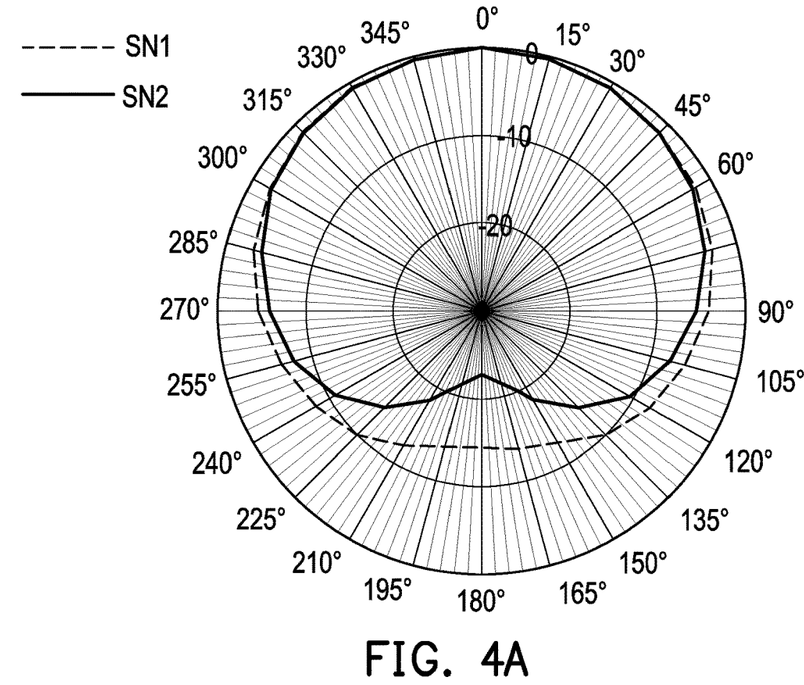
FIG. 4A is a sound cardioid polar pattern showing a corresponding relationship between path difference and directivity.

FIG. 4A is a sound cardioid polar pattern showing a corresponding relationship between path difference and directivity. Please refer to FIG. 3 and FIG. 4A at the same time. In the embodiment, the second path L2 passes through the two slits SL1 and SL2, but the first path L1 does not pass through the slits SL1 and SL2, and the length of the second path L2 is greater than five times the length of the first path L1. Preferably, the length of the second path L2 is greater than eighteen times to twenty-five times the length of the first path L1. As shown in the cardioid polar pattern of FIG. 4A, a curve SN1 represents that the length of the second path L2 is eighteen times that of the first path L1, and a curve SN2 represents that the length of the second path L2 is twenty-five times that of the first path L1. In this way, an obvious path difference is generated for the same sound due to the transmission path, causing difference in reception between the front end (0 degrees) and the rear end (180 degrees), so as to improve the unidirectionality of the microphone to the sound.

Figure 4B:
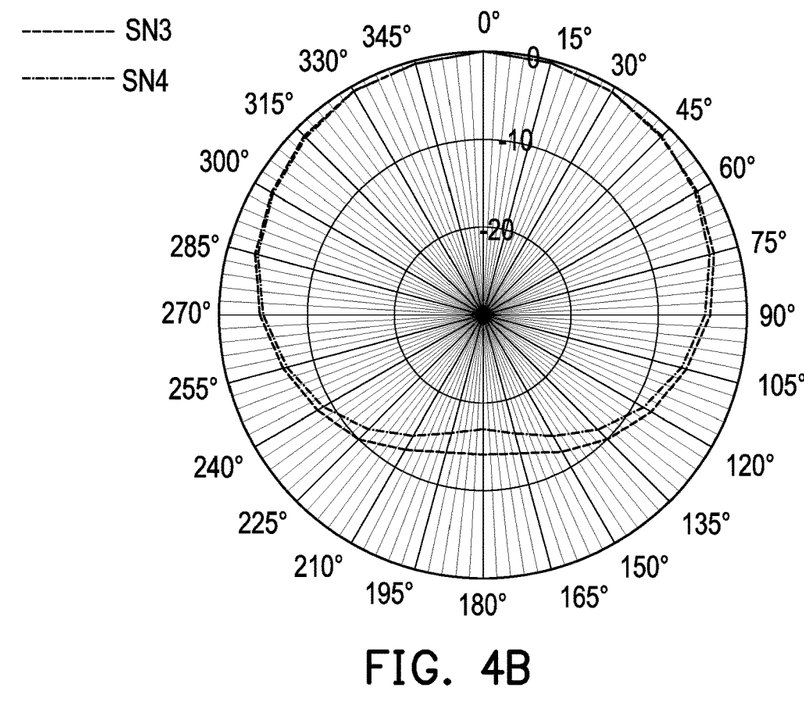
FIG. 4B is a sound cardioid polar pattern showing a corresponding relationship between the number of partitions and directivity.

FIG. 4B is a sound cardioid polar pattern showing a corresponding relationship between the number of partitions and directivity. Please refer to FIG. 4B and respectively compare FIG. 4B with FIG. 3 and FIG. 4A. A curve SN4 shown in FIG. 4B represents that the second layer 120 of FIG. 3 has the partitions 121 and 122 and the slits SL1 and SL2, and a curve SN3 represents that the second layer of FIG. 3 only has the partition 121 and the slit SL1. As such, it can be clearly seen that the number of partitions and slits obviously affects the cardioid polar pattern of the sound, wherein the directivity of the curve SN4 is obviously better than that of the curve SN3.

In other words, it can be clearly seen from the above sound cardioid polar pattern that in order to effectively improve the directivity of the sound, in a preferred embodiment of the disclosure, the length of the second path L2 is required to be more than eighteen times the length of the first path L1, and at least two partitions (or at least two slits) are required.

Figure 5:
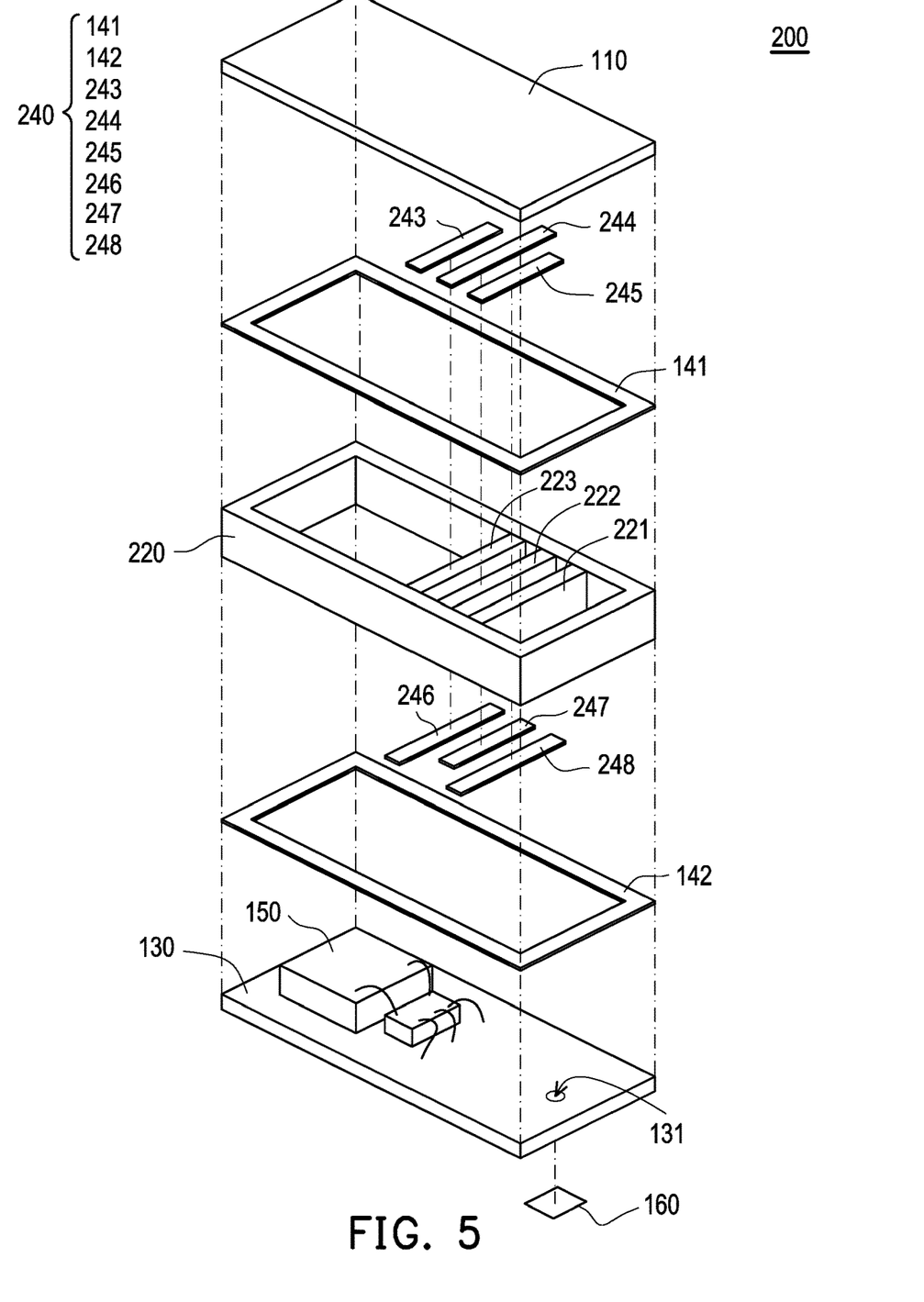
FIG. 5 is an exploded view of a directional MEMS microphone according to another embodiment of the disclosure.
Figure 6:
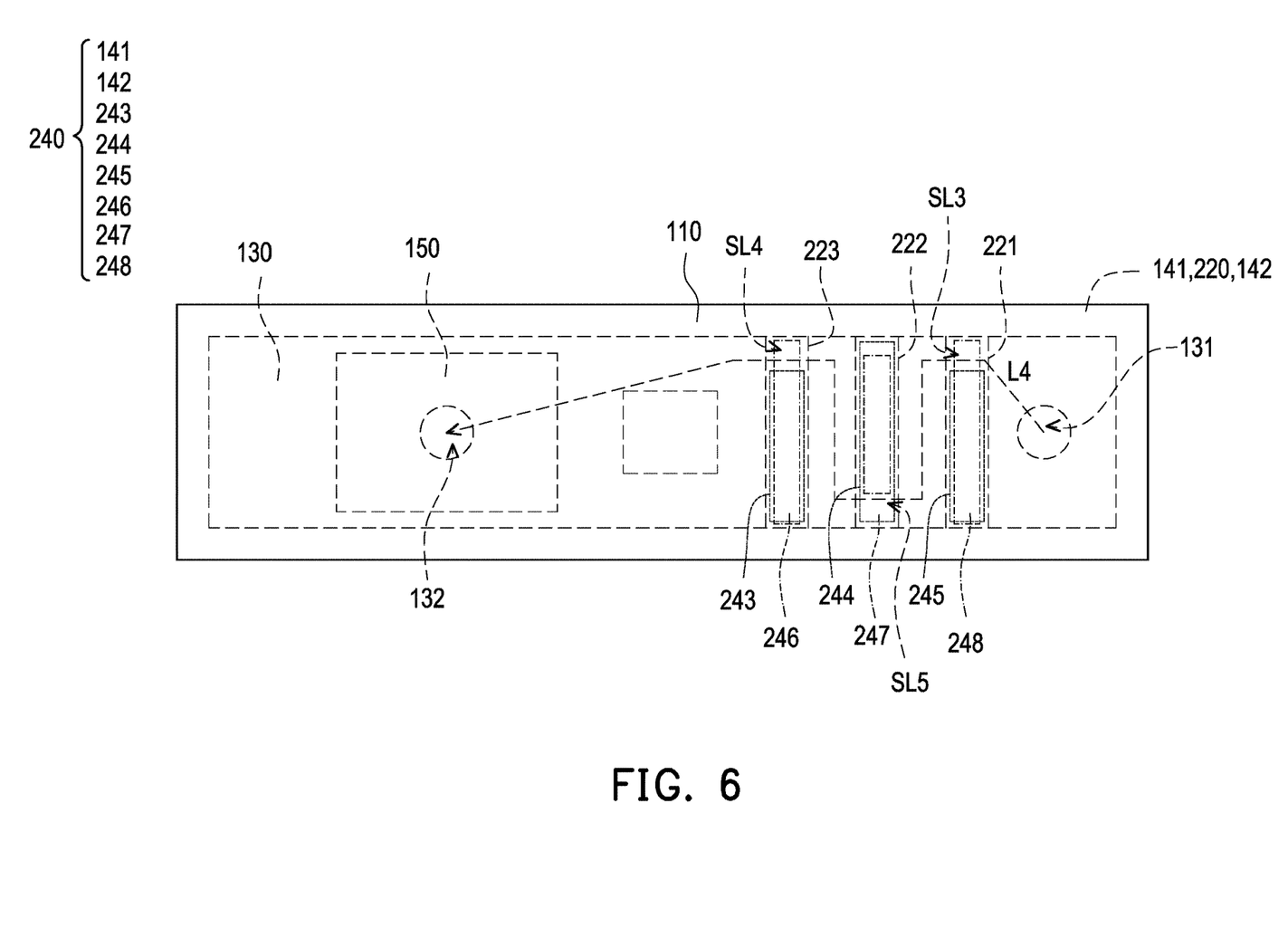
FIG. 6 is a top view of the directional MEMS microphone of FIG. 5.
Figure 7:
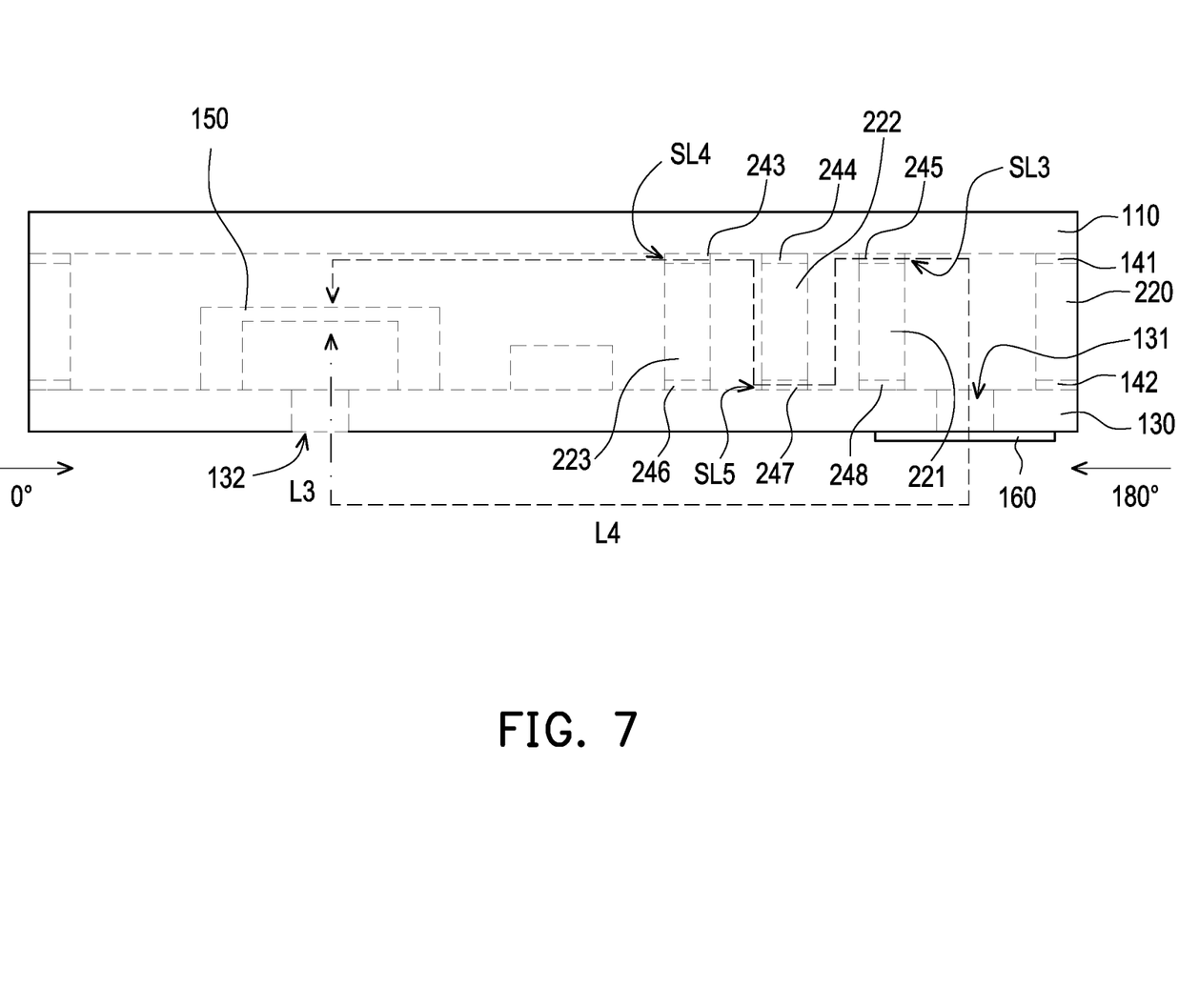
FIG. 7 is a side view of the directional MEMS microphone of FIG. 5.

FIG. 5 is an exploded view of a directional MEMS microphone according to another embodiment of the disclosure. FIG. 6 is a top view of the directional MEMS microphone of FIG. 5. FIG. 7 is a side view of the directional MEMS microphone of FIG. 5. Please refer to FIG. 5 to FIG. 7 at the same time. The difference from the foregoing embodiment is that in a directional MEMS microphone 200 of the embodiment, a second layer 220 has three partitions 221, 222, and 223, and the adhesive member 240 also includes multiple inner adhesive members 243 to 248 in addition to the outer adhesive members 141 and 142, wherein the inner adhesive members 244, 246, and 248 respectively cover an entire top surface of the partition 222, an entire bottom surface of the partition 223, and an entire bottom surface of the partition 221, and the inner adhesive members 243, 245, and 247 respectively cover a partial top surface of the partition 223, a partial top surface of the partition 221, and a partial bottom surface of the partition 222, thereby forming a bent second path L4 as shown in FIG. 6, thus increasing the path length difference between a first path L3 and the second path LA, so as to improve the directivity of the microphone.

Figure 8:
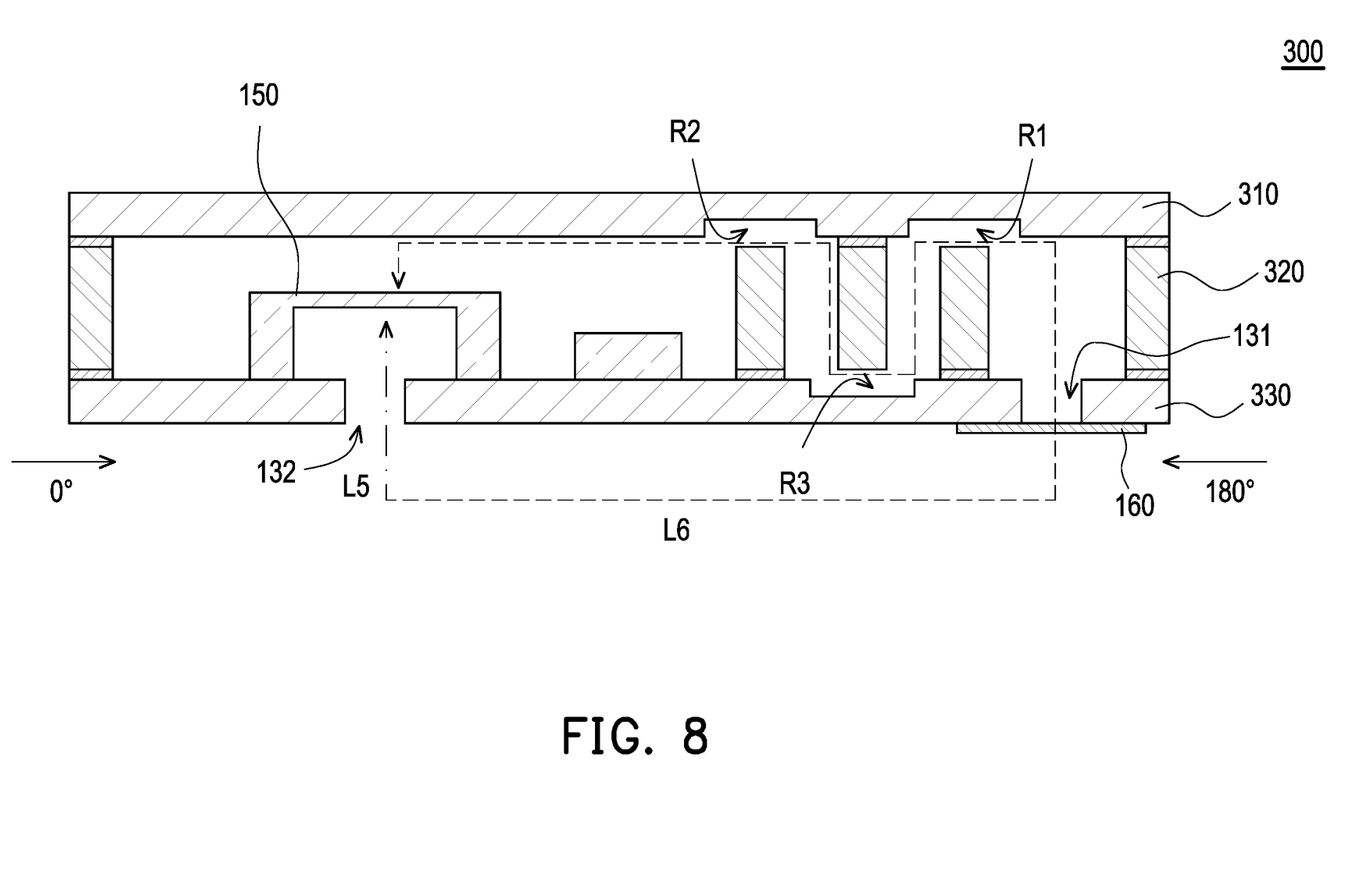
FIG. 8 is a cross-sectional view of a directional MEMS microphone according to another embodiment of the disclosure.

FIG. 8 is a cross-sectional view of a directional MEMS microphone according to another embodiment of the disclosure, wherein the same components as those of the foregoing embodiments will not be described again. Please refer to FIG. 8. The difference from the foregoing embodiments is that a directional MEMS microphone 300 of the embodiment is changed to form recesses R1 to R3 on a first layer 310 and a third layer 330, and the second layer 320 is not provided with the adhesive member on the partition corresponding to the recesses R1 to R3, so that the partition not covered with the adhesive member can further form the slits with the recesses R1 to R3 for the sound to pass through the slits formed by the partition and the recesses R1 and R2 of the first layer 310 and the partition and the recess R3 of the third layer 330 when being transmitted along a second path L6. Furthermore, the sound when being transmitted along the second path L6 causes a path difference from the sound when being transmitted along a first path L5, so as to achieve the required directivity.

Figure 9:
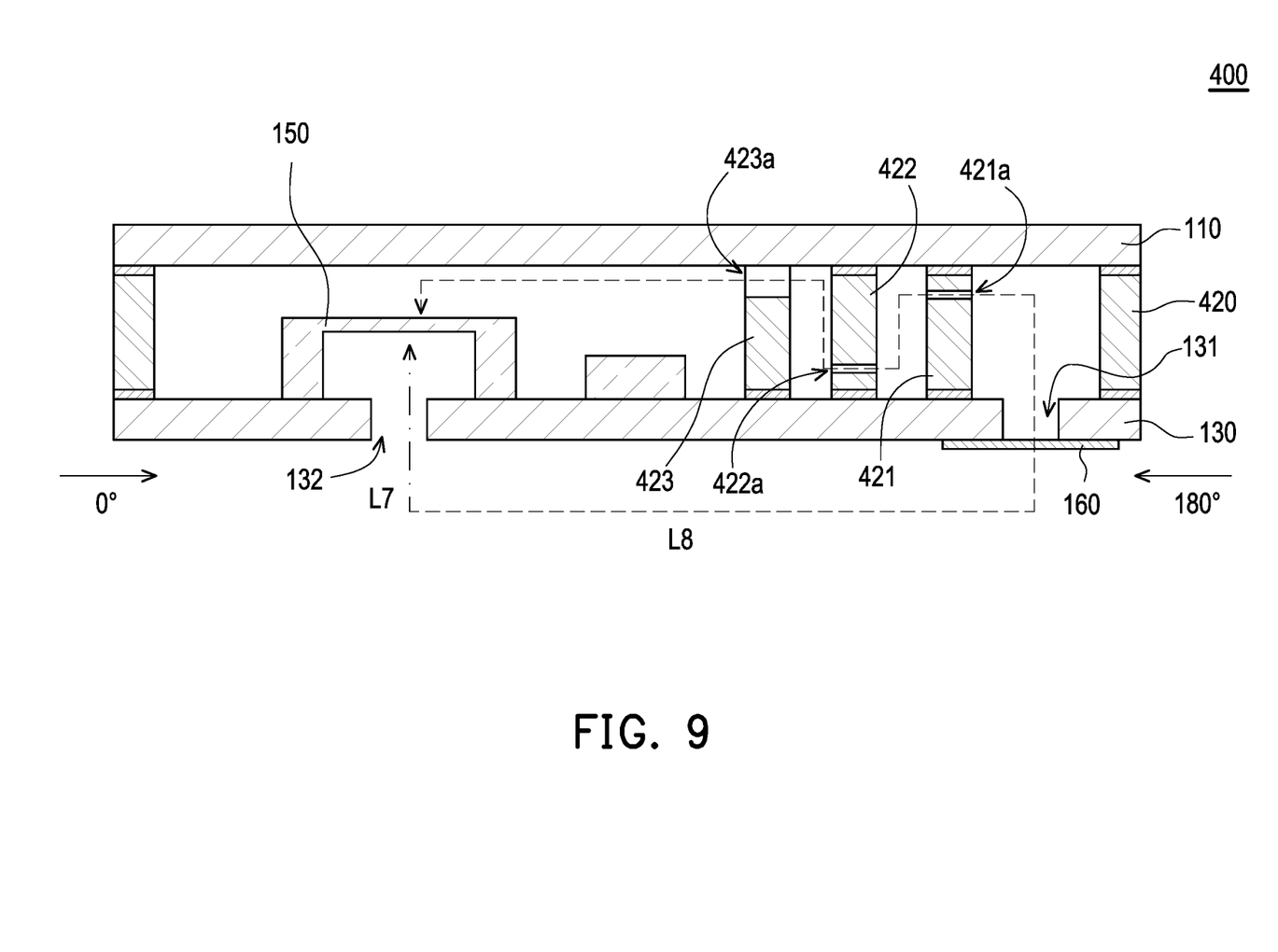
FIG. 9 is a cross-sectional view of a directional MEMS microphone according to another embodiment of the disclosure.

FIG. 9 is a cross-sectional view of a directional MEMS microphone according to another embodiment of the disclosure. Please refer to FIG. 9. In a directional MEMS microphone 400 of the embodiment, the difference from the foregoing embodiments is the formation structure of the slits. As shown in FIG. 9, a second layer 420 has opening structures, thereby forming, for example, a slit 421a on a partition 421, a slit 422a on a partition 422, and a slit 423a on a partition 423, so that chambers separated by the partitions 421 to 423 can be in air communication with each other through the opening structures. As such, when the sound is transmitted along a second path L8, a greater path difference is generated compared with a first path L7, so as to achieve the requirement of improving sound directivity. Different from the foregoing embodiments in which the second layer 120 or the second layer 220 is a constant-height layer, a second layer 420 of the embodiment has a structure with different heights due to the opening structures. For example, the partition 423 forms a height difference due to the opening structure. In other words, in the embodiment, the slits for the sound to pass through are formed through structure of the second layer 420.

In summary, in the foregoing embodiments of the disclosure, the directional MEMS microphone forms the monomer structure of the microphone by the first layer, the second layer, and the third layer stacked in sequence and the adhesive members formed between the first layer, the second layer, and the third layer. More importantly, in the monomer structure formed above, the adhesive members are further divided into the outer adhesive member and the inner adhesive member, wherein the outer adhesive member is disposed surrounding the periphery of the first layer, the second layer, and the third layer, and the inner adhesive member is disposed within the range surrounded by the outer adhesive member.

At the same time, the adhesive members further form the at least two slits. The same external sound respectively passes through the two receiving holes along the two paths and enters the monomer structure and is transmitted to the sound sensing element according to the above component configuration, and one of the two paths passes through the slits.

The layers and the adhesive members can be matched with each other to form the required slits accordingly. In an embodiment, the constant-height second layer can enable the partition not provided with the adhesive member to form the slit with the opposite first layer or third layer according to whether there is the adhesive member on the two opposite sides. In another embodiment, the recesses of the first layer and the third layer or the opening structures of the second layer are matched to form the required slits.

In this way, the sound passing through the slits along one of the paths is limited by the internal structure of the monomer, including staggered configuration of the partitions with the inner adhesive members, to have a longer sound transmission path, and an obvious path difference is generated for the same sound due to the transmission path, causing difference in reception between the front end (0 degrees) and the rear end (180 degrees), so as to improve the unidirectionality of the microphone to the sound.

What is claimed is:

1. A directional microelectromechanical systems (MEMS) microphone, comprising:
   a first layer, a second layer, and a third layer stacked in sequence; and
   a plurality of adhesive members formed between the first layer, the second layer, and the third layer, wherein the adhesive members further comprise an outer adhesive member disposed surrounding a periphery of the first layer, the second layer, and the third layer and an inner adhesive member disposed within a range surrounded by the outer adhesive member, and at least two slits are formed between the first layer and the second layer and between the second layer and the third layer, wherein
   an external sound is transmitted to a sound sensing element in the directional MEMS microphone after passing through two receiving holes of the directional MEMS microphone respectively along two paths, and one of the two paths passes through the at least two slits.

2. The directional MEMS microphone according to claim 1, wherein the second layer has a plurality of partitions, and the inner adhesive member is adhered between the partitions and the first layer to form the slit at least two slits between the partitions and the third layer.

3. The directional MEMS microphone according to claim 1, wherein the second layer has a plurality of partitions, and the inner adhesive member is adhered between the partitions and the third layer to form the slit at least two slits between the partitions and the first layer.

4. The directional MEMS microphone according to claim 1, wherein the second layer has a plurality of partitions, and the inner adhesive member is disposed on a part of the partitions, so that another part of the partitions not provided with the inner adhesive member forms the at least two slits with the first layer or the second layer.

5. The directional MEMS microphone according to claim 1, wherein the second layer has a plurality of partitions, at least one of the first layer and the second layer has at least one recess, and the at least one recess corresponds to the partitions to form the at least two slits.

6. The directional MEMS microphone according to claim 1, wherein the two paths comprise a first path and a second path, the second path passes through the at least two slits, the first path does not pass through the at least two slits, and a length of the second path is greater than five times a length of the first path.

7. The directional MEMS microphone according to claim 1, wherein the two paths comprise a first path and a second path, the second path passes through the at least two slits, the first path does not pass through the at least two slits, and a length of the second path is greater than eighteen times to twenty-five times a length of the first path.

8. The directional MEMS microphone according to claim 1, wherein the first layer, the second layer, and the third layer are respectively printed circuit boards.

9. The directional MEMS microphone according to claim 1, wherein the third layer has the two receiving holes.

10. The directional MEMS microphone according to claim 1, wherein the first layer and the third layer respectively have the two receiving holes.

11. The directional MEMS microphone according to claim 1, wherein a width of each of the at least two slits is greater than or equal to 20 µm.

12. The directional MEMS microphone according to claim 1, further comprising: a sound damping member, disposed in one of the two receiving holes, wherein the path passing through the at least two slits also passes through the sound damping member.

13. The directional MEMS microphone according to claim 1, wherein the second layer is a constant-height layer.

14. The directional MEMS microphone according to claim 1, wherein the second layer has a plurality of partitions to separate an inside of the directional MEMS microphone into a plurality of chambers, wherein the chambers are in air communication with each other by the at least two slits.

15. The directional MEMS microphone according to claim 14, wherein the partitions further comprise at least one opening structure, and the chambers are in air communication with each other by the opening structure and the at least two slits.

* * * * *